Figure 1:
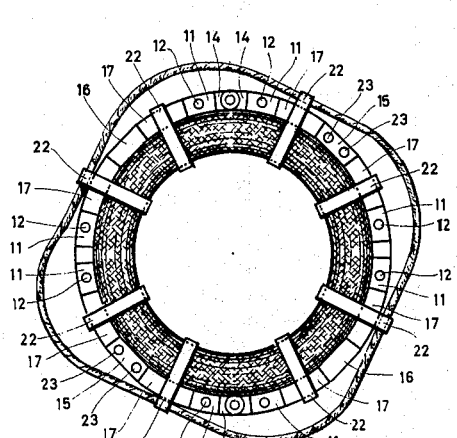

Jan. 4, 1966     A. M. SENKEWICH     3,226,740

LIGHTED LIFE DEVICES

Filed July 1, 1965     2 Sheets-Sheet 1

INVENTOR.

Alexander Senkewich

Jan. 4, 1966 A. M. SENKEWICH 3,226,740
LIGHTED LIFE DEVICES
Filed July 1, 1965 2 Sheets-Sheet 2
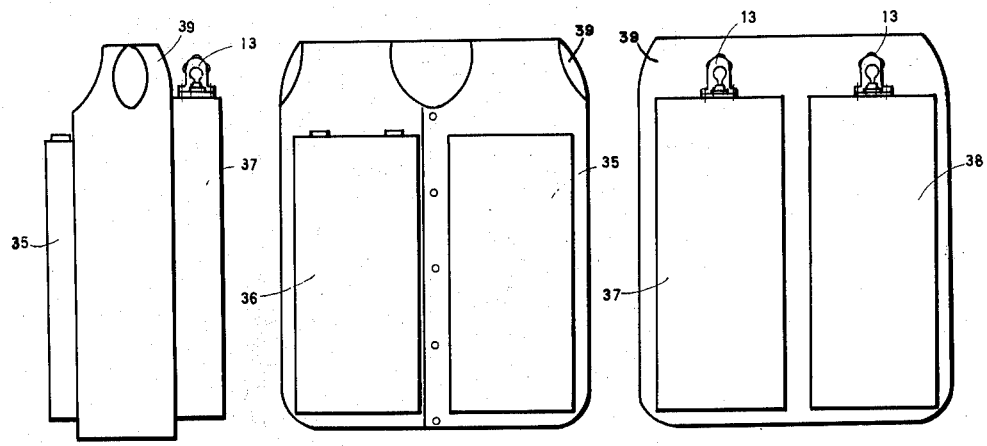
Fig. 13   Fig. 11   Fig. 12
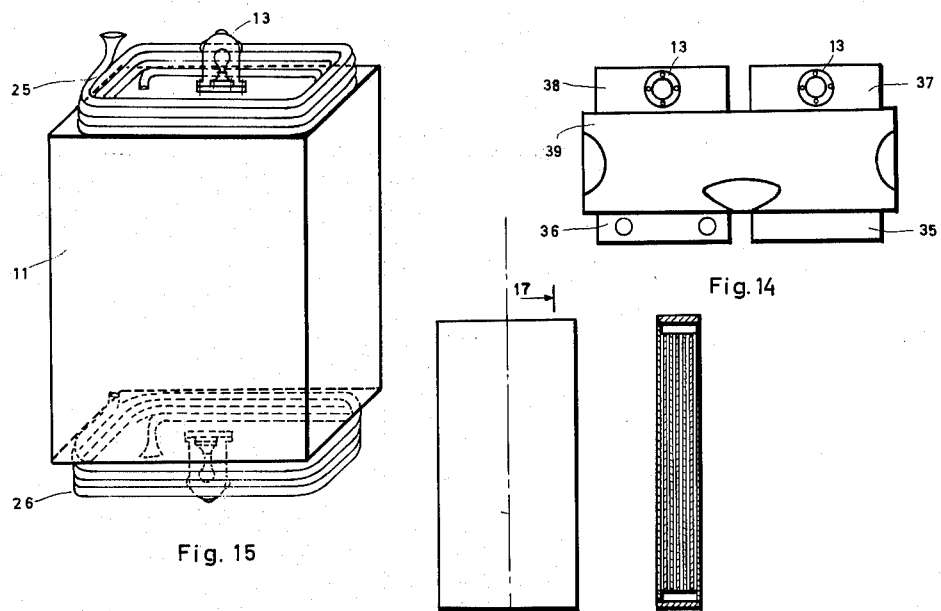
Fig. 15   Fig. 14
Fig. 16   Fig. 17   INVENTOR.
Alexander Senkewich
Fig. 18

3,226,740
LIGHTED LIFE DEVICES
Alexander M. Senkewich, 545 W. 164th St.,
New York 32, N.Y.
Substituted for abandoned application Ser. No. 193,821,
May 10, 1962. This application July 1, 1965, Ser. No.
472,392
4 Claims. (Cl. 9—313)

This specification, a substitute of application S.N. 193,-821, filed May 10, 1962, now abandoned, covers especially the use of a new principle of construction of devices which generate and transmit electric current to light signals attached to individual life saving ring buoys and life saving vests.

In order not to be dependent on some special electrolyte, the chemical-electrical cells must operate on sea water; automatically filling these cells when the life preserver becomes immersed in sea water. However, such chemical-electrical cells possess a very modest voltage of the order of 1.0–1.5 volts. Thus they are not sufficiently strong to produce a bright, far visible, light signal. A group of such cells, each standing in direct contact with sea water cannot be connected in series since the high summary conductivity of the large volumes of sea water around the cells would cause the appearance of stray currents greatly wasting the energy of the cells.

The principle used consists in the elimination of direct contact of the inner space of each cell with the surrounding sea water. The necessary contact is established by flexible and elastic tubings of small inner diameters and sufficient length hermetically fitted into the upper and lower ends of the cells. This does not impede the penetration of sea water into the cells, but forms a sufficiently high electrical resistance and thus impedes the formation of stray currents between the neighbor cells connected in series.

For illustration, a tubing 100 mm. long and 6 mm. inside diameter filled with sea water at ordinary temperature (resistivity=20+ohm/cm.$^3$) will produce an electrical resistance of nearly 700 ohms, and the tubings of the neighbor cells connected in series would produce a resistance of 1,400 ohms. Should there be two such tubings at each end of each cell, in order to insure the penetration of water into the cells their action in parallel would leave 350 ohms along the way in which stray currents would have to pass.

If the cells were not provided with such electrical resistance forming tubings, the resistance of sea water between the cells would amount to no more than 3.3 ohms on the assumption that all lines of the stray currents were limited to a sphere of sea water of 50 mm. diameter. Without this limitation, or with larger distances between the cells, the total inter-cellular resistance might be still lower and the stray currents stronger.

Another source of wastage of energy lies in the necessity of providing two opposite electric bulbs for each series of cells when the light signals have to be attached to the life saving buoy rings. Both signals would become lit with only the upper one working usefully while the lower one would waste its light downwardly.

To eliminate this additional waste of current, an automatically acting direction reversing switch is used. The latter can be built upon the principle of a float as shown here for the sake of illustration. Other principles, like that of a movable mercury column or of a heavy pendulum capable of freely falling through an arc of 160 degrees and thus always contacting the proper light signal also could be efficiently used.

Figure 9:
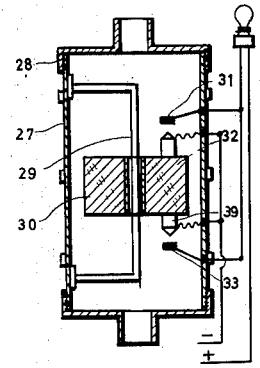
Figure 8:
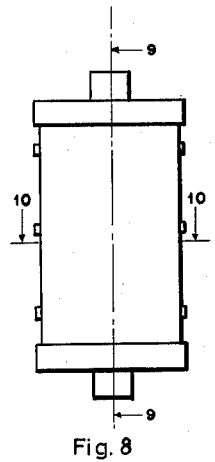
Figure 2:
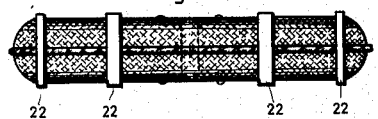
Figure 10:
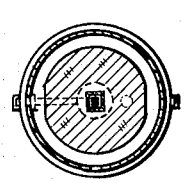
Figure 3:
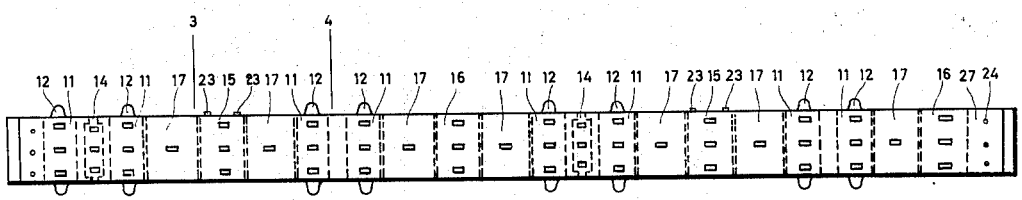
Figure 4:
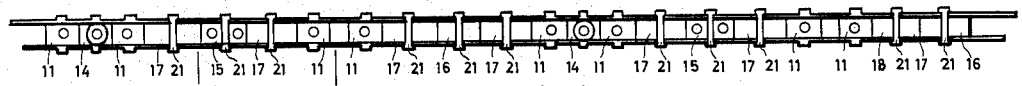
Figure 5:
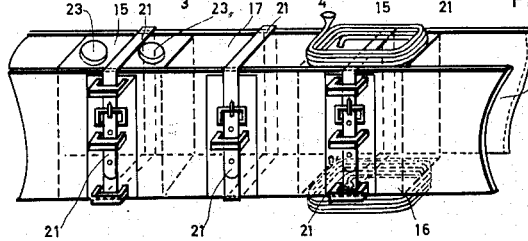
Figures 6, 7:
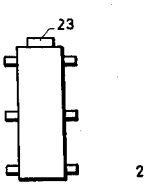

Referring to the figures broadly, they are as follows:

FIG. 1, plan of the complete life saving and sustaining ring buoy.
FIG. 2, elevation of ring buoy.
FIG. 3, elevation of the complete assembled attachable belt as used in the complete ring buoy.
FIG. 4, plan of attachable belt.
FIG. 5, isometric view of a part of the attachable belt between lines 3—3 and 4—4 in FIGS. 3 and 4.
FIG. 6, elevation of vessel intended for storing food and drinking water.
FIG. 7, plan of vessel.
FIG. 8, elevation of float switch.
FIG. 9, vertical section of float switch taken along line 9—9 in FIG. 8.
FIG. 10, horizontal cross section through float switch taken along line 10—10 in FIG. 8.
FIG. 11, front view of the complete life saving vest.
FIG. 12, rear view of vest.
FIG. 13, side view of vest.
FIG. 14, horizontal view of vest.
FIG. 15, isometric view of current producing cell with two resistance producing spirals of tubings and with two electric light signals.
FIG. 16, front view of current producing cell.
FIG. 17, sectional view of current producing cell taken along line 17—17 in FIG. 16.
FIG. 18, plan of the current producing cell.

In connection with the complete life saving ring buoy illustrated in FIGS. 1 and 2, the ring buoy carries a number of current producing cells 11 which are activated on submersion into sea water. Electric bulbs 12 receive the light signals, while special switches for directing the current exclusively to the bulbs are on the buoy's upper surface when the buoy is immersed in water. Also provided are one or more sealed vessels 15 containing food and drinking water, and one or more vessels carrying shark repellants.

Referring to the attachable belt carrying the light system and other life sustaining containers as illustrated in FIGS. 3, 4, and 5, the belt is shown in the assembled state and for the sake of illustration is supposed to carry: eight current producing cells 11, two float switches 14, two vessels for food and drinking water 15, two vessels containing shark repellants. All these elements are attached with strong strips of textile or plastic material to the belt which is made of strong belting. The complete attachable belt is fastened to the ring buoy by cord 24 and by strips of belting 22 for which metallic or wooden cleats can be substituted.

In connection with the current producing cells as illustrated in FIGS. 15, 16, 17, 18, and 5, details of the cell 11 are shown in FIG. 15 by an isometric projection together with the two spirally wound tubings 25, 26 (through which the cell is filled on submersion with sea water) and with two electric bulbs 13. In FIG. 5, the same cell 11 is shown as attached to the attachable belt. The tubings 25, 26 are shown in FIG. 5 but the electric bulbs 13 are not.

The tubings might be of various lengths and various cross sectional areas. With the ohmic resistivity of sea water equal to 20 ohms or more, the ohmic resistance of a tubing is at least $20\ L/A$ ohms, where L is the length and A the inner cross sectional area of the tubing. In most cases a length of 100 mm. and an inside diameter of 6 mm. or less will be sufficient for the creation of a resistance of more than 700 ohms, while still permitting an easy penetration of sea water into the cell. The tubings may be arranged either as helices or in a zig-zag fashion.

Re float switch illustrated in FIGS. 8–10, the float switch consists of a chamber 27 of an insulating material open at both ends. Into it is placed a metallic yoke 29 along the axis of which a float 30 slides with very little friction. This float carries two contact pins 32, 39, and the chamber of the switch carries two spring electrodes fixed to these pins and two contacts 31, 33 to the tubular electric bulb. The chamber of the switch is closed by two nipples 28 through which sea water can enter the chamber thus raising the float and contacting that bulb which occupies a position upon the upper surface of the buoy.

FIGS. 1, 3 and 4 show the placements of two float switches 14. They are so arranged as to work in parallel connecting the same electric lights. Thus a failure of one float switch shall leave another one to control the direction of the current.

Re the life saving, fully equipped vest as illustrated in FIGS. 11, 12, 13, and 14, has all necessary attachments. This includes at least two lighting systems consisting of the electric cells with resistance creating (stray current eliminating) tubings, and light signals, vessels for food, drinking water and shark repellants which can be placed in four or five pockets secured each separately to the existing vests. It is preferable, however, to attach all pockets to a separate casing 39 of proper textile material, which casing can be thrown over the existing vest and tied to it beforehand. In the figures depicting such a casing (FIGS. 11-14) 37, 38 are pockets carrying the current producing cells, 13 are the electric light signals placed with the cells on the back of the vest or of the special casing. 35 and 36 are the pockets carrying food, drinking water and shark repellants in sealed containers. The casing carrying all these devices is marked 39.

What is claimed is:

1. A ring life preserver comprising a buoyant ring and a belt peripherally secured thereto, said belt comprising spaced parallel straps, sealed water and food containers supported between said straps, electrolytic power producing means, switch means, and lighting means supported between said straps, said power means being electrically connected to said lighting means through said switch means.

2. The device of claim 1 in which said lighting means comprises opposed lamps which respectively face in the same direction as the opposed upper and lower surfaces of said buoyant ring so that one of said lamps will face upwardly, out of the water, depending on which side of the preserver is facing upwardly in the water, and the other of said lamps will be submerged in the water.

3. The device of claim 2 in which said switch means comprises a float chamber having opposite, vertically disposed open ends, a float within said chamber and free to rise toward either of said ends of said chamber depending on which side of said ring is facing upwardly, an electrical contact carried on the upper and lower sides of said float, and stationary electrical contacts supported within said chamber and arranged so that when the float rises toward either end of said chamber an electrical circuit is completed between said power source and only the then upwardly facing lamp.

4. The device of claim 1 having a series of electrical cells, tubular connections connecting the inner spaces of said cells with the surrounding sea water whereby a large resistance will be introduced into a circuit of parasitic current and thereby reducing the wastage of current into the sea when said cells are connected in series.

References Cited by the Examiner
UNITED STATES PATENTS

| | | | |
|---|---|---|---|
| 2,109,813 | 3/1938 | Winckler | 9—313 |
| 2,642,591 | 6/1953 | Craver | 9—8.3 |
| 2,996,227 | 8/1961 | Andrew | 340—366 |
| 3,122,736 | 2/1964 | Weber | 9—313 |

MILTON BUCHLER, *Primary Examiner.*

A. E. CORRIGAN, *Assistant Examiner.*

UNITED STATES PATENT OFFICE
CERTIFICATE OF CORRECTION

Patent No. 3,226,740                                 January 4, 1966

Alexander M. Senkewich

It is hereby certified that error appears in the above numbered patent requiring correction and that the said Letters Patent should read as corrected below.

In the grant, line 3, after "New York, N. Y.," insert -- assignor of five percent to Linda Heilman, and five percent to Marjorie Kingston, --; line 12, for "Alexander M. Senkewich, his heirs" read -- Alexander M. Senkewich, Linda Heilman, and Marjorie Kingston, their heirs --; in the heading to the printed specification, lines 3 and 4, for "Alexander M. Senkewich, 545 W. 164th St., New York 32, N. Y." read -- Alexander M. Senkewich, New York, N. Y., assignor of five percent to Linda Heilman, and five percent to Marjorie Kingston --.

Signed and sealed this 13th day of December 1966.

(SEAL)
Attest:

ERNEST W. SWIDER                                        EDWARD J. BRENNER
Attesting Officer                                                Commissioner of Patents